3,824,141
MANUFACTURE OF VULCANIZED
ELASTOMERIC HOSE
Robert Miller, Woodbridge, and Carl Derderian, Cheshire, Conn., assignors to Uniroyal, Inc., New York, N.Y.
Filed Aug. 29, 1972, Ser. No. 284,563
Int. Cl. B29c 25/00
U.S. Cl. 156—143
32 Claims

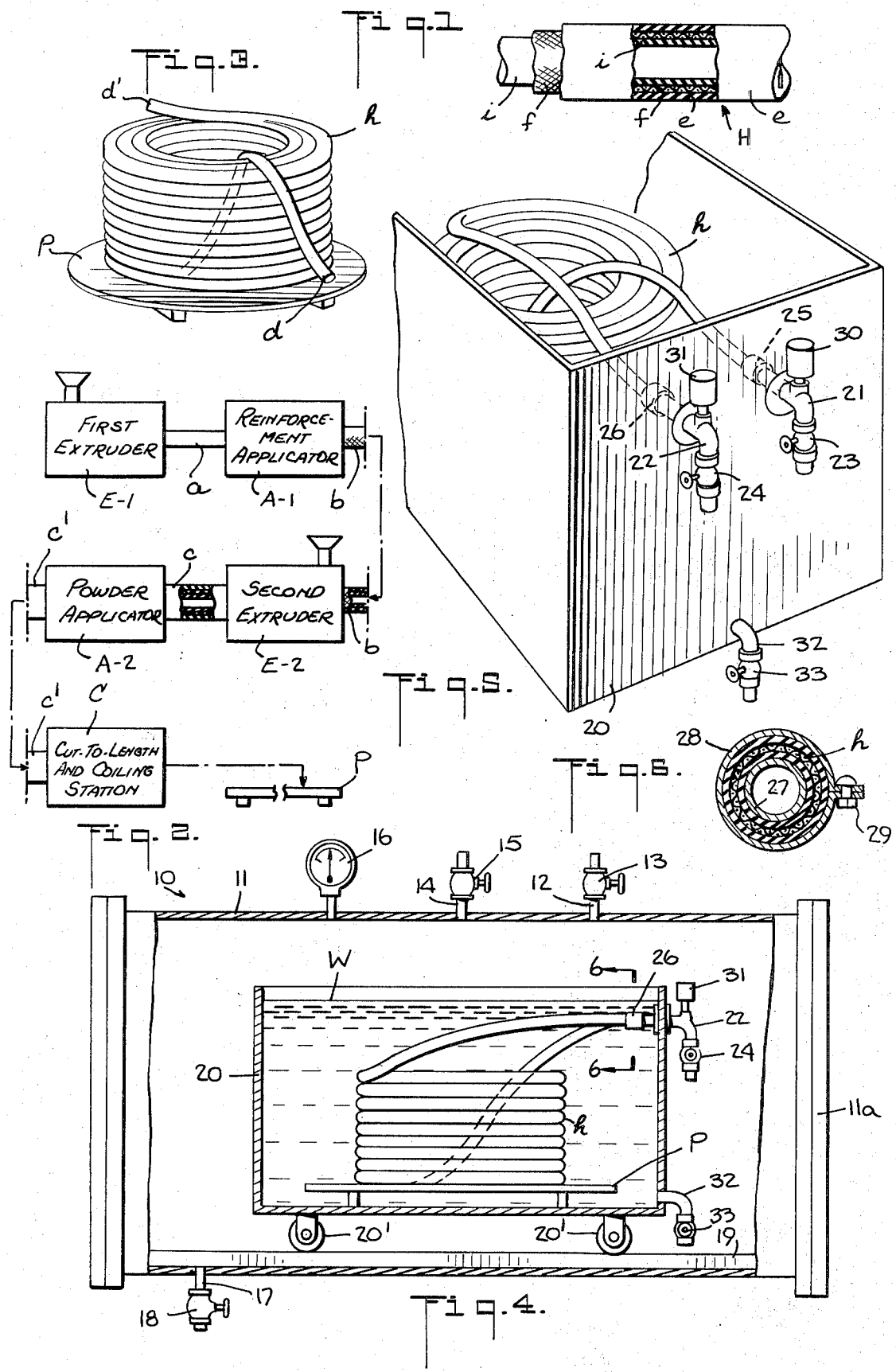

ABSTRACT OF THE DISCLOSURE

A batch process for vulcanizing reinforced elastomeric hose, which avoids the use of the lead press method, is disclosed. The process basically entails annularly clamping the opposite ends of the uncured hose so as to prevent entry of fluid pressure into the space between any two proximate layers of elastomeric material occupied by a layer of reinforcement, immersing the hose in a bath of liquid, e.g. water, sufficient to cover the hose substantially completely, and then in a pressurized heating environment, e.g. in a steam-filled vulcanizer or autoclave, subjecting the uncured hose at both its inner and its outer surfaces to the action of a pressurized heating fluid at the desired vulcanizing temperature. The process may be practiced with the hose either filled with a liquid such as water or empty, and so that either the same pressure is applied to both said hose surfaces or a higher pressure is applied to the inner hose surface than to the outer one. The hose interior may be opened or closed at its opposite ends to the autoclave interior. If closed, the hose is filled with liquid and a pressure relief valve is preferably provided to ensure that the pressure within the hose cannot exceed the pressure around the hose by more than a predetermined amount. This abstract is not to be taken either as a complete exposition or as a limitation of the present invention, however, the full nature and extent of the invention being discernible only by reference to and from the entire disclosure.

---

This invention relates to the art of manufacturing vulcanized reinforced elastomeric hose.

Vulcanized reinforced elastomeric hose such as garden hose, automobile heater hose, and the like, is normally produced in either indeterminate great lengths by a continuous process or in relatively shorter finite lengths by a batch process. In either type of operation, the basic steps involved in the formation of the uncured hose are essentially the same. Thus, a curable elastomeric compound is first extruded in tubular form. A reinforcing sleeve or layer structure of metallic or non-metallic filamentary material is then built up on or otherwise applied to the exterior of the extruded tube of elastomer while the same is supported on a mandrel or internally pressurized to prevent collapse, and the resultant composite is then passed through a suitable extruder by means of which an outer covering of curable elastomeric compound is applied over the reinforcing structure. For some types of hose intended for use at higher pressures, additional layers of reinforcement and elastomeric covering material may be applied in sequence over the said outer covering.

Beyond this stage, however, the two processes diverge. In a continuous process, the uncured hose so formed is continuously passed from the final extruder into and through a vulcanizing apparatus, for example such as disclosed in U.S. Pat. No. 3,586,558. From the vulcanizing apparatus, the cured hose is led to any suitable take-up or storage means. In a batch process, on the other hand, a sheath of lead is applied to the exterior of the uncured hose, generally also by an extrusion stage, the lead sheath in cooperation with the solid or fluid-constituted mandrel within the hose serving as a mold in which the hose, upon disposal in a vulcanizer or autoclave, will be cured. At the end of the cure cycle, the lead sheath must be stripped from the cured hose before the latter is forwarded to the take-up or storage means. This process is conventionally referred to as the "lead press" method.

The continuous process as described above, although affording some advantages over the lead press method, nevertheless does have the drawback of requiring an extended production line and thus entailing major capital expenditures for both space and equipment. Moreover, being a non-pressure cure, the continuous process also requires special compounding of the elastomeric material, and hose produced thereby is frequently found to suffer from such problems as excessive porosity and poor adhesion between the elastomeric material and the reinforcement. The lead press method, also costly in terms of labor and capital investment, has the added drawbacks of entailing the extra operations involved in forming and destroying the lead sheath for each hose length cured, and of resulting in the formation of large amounts of hose scrap.

It is an important object of the present invention, therefore, to provide a novel and greatly improved batch process of manufacturing vulcanized reinforced elastomeric hose in such a manner as to enable at least some of the drawbacks and disadvantages of the known hose production methods described above to be avoided.

Generally speaking, the objectives of the present invention are attained by a process in which the length of uncured hose to be vulcanized is first annularly clamped at each of its opposite ends and then, while immersed in a bath of liquid and either filled with liquid or not, is disposed in a pressurized heating environment such as a steam-filled vulcanizer or autoclave and there subjected at both its inner and its outer surfaces to the direct action of fluid pressure at the desired vulcanizing temperature. By virtue of the annular clamping of the hose ends, any entry of fluid pressure into the space between any two proximate layers of elastomeric material occupied by a layer of reinforcement is effectively inhibited. As a result, the opposing pressures directed interiorly of the hose wall and exerted by the heating fluid against the inner and outer hose surfaces will be greater initially than any back or counter pressure directed exteriorly of the hose wall and exerted by such air or other vapors as may be trapped between the elastomeric layers. This ensures that the elastomeric material will be properly pressed against and forced into the interstices of the reinforcement so as to achieve good adhesion between the reinforcement and the elastomeric material in the ultimate molded hose.

More particularly, the hose vulcanizing process according to one embodiment of the present invention may be practiced in such a manner that equal pressures are applied to the inner and outer hose surfaces. For this form of the process, which requires the hose ends to be left open, each of the annular clamping devices is constituted by a rigid, relatively short, open-ended tubular core member and an associated encircling clamping band or strap, the outer diameter of each core member being slightly less than the inner diameter of the uncured hose so as to fit easily but closely thereinto. Thus, when an uncured hose, having the clamping bands positioned around the outer hose end surfaces and tightened against the same and the respective core members fitted into the hose ends, is placed into an autoclave, the high pressure steam admitted into the latter can heat the hose via the liquid bath and the liquid within the hose or, if the latter is empty, can also flow through the hose.

The process according to another embodiment of the present invention may also be practiced in such a manner that a greater pressure is applied to the inner surface of the hose than to its outer surface. In the preferred version of this form of the process, which requires the uncured hose to be filled completely with liquid as well as immersed in a liquid bath (water is preferred but other incompressible liquids such as oils, glycols, and the like having a boiling point at least as high as water can also be used), the core member of each of the annular clamping devices is constituted by a rigid, relatively short, tubular nipple or like extension of a respective valve-controlled pipe used for filling and draining the hose, the outer diameter of each nipple being again slightly less than the inner diameter of the uncured hose. In such a vulcanizing operation, after the water-covered and water-filled hose (with the valves in the filling/draining pipes closed) is placed into the autoclave, high pressure steam is admitted into the latter so that the water bath is heated, which in turn heats the hose and therethrough the water in the hose. As the water confined in the hose becomes warmer, it expands and consequently exerts on the inner hose surface a pressure which is higher than the pressure exerted by the surrounding unconfined body of water on the outer hose surface. This ensures that the elastomeric material will be properly pressed against and forced into the interstices of the reinforcement so as to achieve good adhesion between the reinforcement and the elastomeric material in the ultimate molded hose. The pressure differential is maintained within predetermined limits, however, for example by means of a pressure relief valve connected to the hose, to ensure that the hose will not become oversized or burst. At the end of the heating cycle, the pressure in the autoclave is released and the temperature permitted to drop, generally to less than 200° F. and preferably to about 150° F., whereupon the vulcanized hose is opened and drained and removed for storage and/or further processing such as cleaning, marking, etc.

The foregoing and other objects, characteristics and advantages of the present invention will be more clearly understood from the following detailed description thereof when read in conjunction with the accompanying drawing, in which:

FIG. 1 is a fragmentary plan view, partly broken away and partly in section, of a cured reinforced elastomeric hose of conventional construction;

FIG. 2 is a block diagram illustrating schematically the manner of forming uncured hose to be vulcanized;

FIG. 3 is a perspective illustration of a length of such uncured hose as deposited in a coiled state on a pallet or like support at the end of the hose forming process illustrated in FIG. 2;

FIG. 4 is a side elevational view, partly broken away and partly in section, of an apparatus for vulcanizing uncured hose in a batch process according to one embodiment of the present invention;

FIG. 5 is an enlarged, fragmentary, perspective view of an immersion vessel or tub constituting a part of the apparatus shown in FIG. 4 and into which the uncured hose, coiled on a support as shown in FIG. 3, is placed preparatory to the performance of a vulcanizing operation; and FIG. 6 is a greatly enlarged sectional view taken along the line 6—6 in FIG. 4 which illustrates not only the clamping device used in the differential pressure method but also the clamping device used in the equal pressure method according to the present invention.

Referring now first to FIG. 1, the type of hose H to the production of which the present invention pertains is of generally conventional construction, including in its simplest form interior and exterior tubular layers $i$ and $e$ of elastomeric material, and an intermediate tubular layer $f$ of filamentary reinforcing material. The elastomeric material may be any of those normally used in hose manufacture, for example natural rubber, SBR (styrene butadiene rubber), neoprene, EPDM (ethylene proplyene diene monomer rubber), EPR (ethylene propylene copolymer rubber), butyl rubber, cis-polybutadiene, cis-polyisoprene, polyurethane, and the like, as well as blends of natural and synthetic rubbers and vulcanizable blends of rubbers and resins such as vinyl resin-nitrile rubber blends. The filamentary reinforcement may be constructed of metallic filaments or strands, e.g. steel wire, or of non-metallic filaments or strands of natural or synthetic fibers, e.g. cotton, glass fiber, rayon, nylon, polypropylene, polyester, etc., and the reinforcement may be of a braid, spiral, knit or woven construction.

Basically, the manner of forming an uncured hose $h$ is generally conventional, as shown in FIG. 2. An uncured elastomeric compound of any suitable composition is extruded in tubular form from a first extruder E–1. The tube $a$ so formed is fed through a reinforcement applicator A–1 where the filamentary reinforcement is applied to the exterior of the tube $a$ to produce a composite two-layer tube $b$. The latter is then fed through a second extruder E–2 where a covering or layer of elastomeric compound is applied to the exterior of the composite tube $b$ to produce a three-layer composite tube $c$. During the foregoing stages, air under pressure may be applied to the interior of the tube $a$ so as to ensure that it will remain at the desired pre-cure diameter. From the extruder E–2 the tube $c$ is passed through a powder applicator A–2 where a suitable antistick powder, such as mica, talc or the like, is applied to the outer surface of the tube $c$. The dusted tube $c'$ is then fed to a final station C where, if necessary or desired, it may be cut to the desired length and is deposited as the uncured hose $h$ in coiled form on a pallet P or like support (see also FIG. 3).

Referring now to FIGS. 4 and 5, the apparatus 10 for vulcanizing the hose $h$ by means of the differential pressure method of the present invention includes an autoclave or vulcanizer 11 provided (elements normally found in such autoclaves but not pertinent here have been omitted for the sake of simplicity) with a boltable front end door or closure 11a, a steam inlet port 12 controlled by a valve 13, a venting port 14 controlled by a valve 15, a pressure gauge 16, and a liquid drain port 17 controlled by a valve 18. Arranged on the floor of the autoclave 11 are two rails 19 (only one is shown) defining a track for an immersion vessel or tub 20 mounted on wheels 20'. It will be apparent that the tub itself need not be wheeled but could be supported on a separate wheeled truck (not shown). The tub 20 is provided with water inlet and outlet pipes or fittings 21 and 22 mounted in one of the walls of the tub near the top thereof and controlled by valves 23 and 24, the fittings having respective hose end clamping devices 25 and 26 disposed within the confines of the tub. Each of the clamping devices includes, as illustrated for the device 26 in FIG. 6, a tubular rigid core member 27 having an outer diameter just less than the inner diameter of the hose $h$ so as to fit smoothly thereinto, and a cooperating clamping band or strap 28 having adjustable locking or tightening means 29. The core members preferably are about 1 to 2 inches in length and may have a slightly roughened outer surface for better gripping effect, and the straps may be of equivalent width or somewhat narrower. The pipes or fittings 21 and 22 are further in communication with respective pressure relief valves 30 and 31. Optionally, only one such relief valve may be utilized. A drain port 32 controlled by a valve 33 may be provided on the tub near the bottom thereof.

In vulcanizing an uncured hose $h$ by the differential pressure method of the present invention, the pallet P and the length of hose supported thereon (the hose is shown as coiled but it may be otherwise laid down, if desired) are placed into the tub 20, and the ends $d$ and $d'$ of the hose are connected to the pipes or fitting 21 and 22 by means of the clamping devices 25 and 26, respectively. With the valve 33 closed, the tub 20 is then filled with enough water W to cover the uncured hose entirely (FIG. 4), and with both valves 23 and 24 open, the interior of the hose is filled with water, the latter being admitted via the inlet fitting 21 from any suitable source (not shown), and the filling process continuing until a solid stream of water is seen to flow out of the outlet fitting 22 to signify that all air has been expelled from the hose h. It will be clear that the hose-filling operation may take place before, after or simultaneously with the tub-filling operation, but it is preferred to fill the hose last to minimize the possibility of deformation thereof due to the added weight of the water therein. The valves 24 and 23 are then closed in that sequence, ensuring that the interior of the hose remains completely filled with water.

With the tub 20 in the autoclave 11, the door 11a thereof is now bolted shut, and, with the valves 15 and 18 closed and the valve 13 open, live steam is admitted into the autoclave via the port 12 to raise the temperature within the autoclave to the desired vulcanizing temperature. The precise temperature selected will, of course, depend on the cure requirements of the various herein mentioned elastomeric compounds, and although it is contemplated that normally the vulcanizing temperature will be on the order of about 316° F., corresponding to a steam pressure of about 70 p.s.i., higher or lower temperatures can be used.

As the temperature in the vulcanizer rises and the water W in the tub 20 becomes warmer (here it might be noted that steam, in addition to being admitted into the ambient space of the autoclave, can also be blown by a separate pipe directly into and through the water in the tub to increase the rate of heating of that water, and that the pallet P may be perforated to provide for increased water circulation and contact with the hose), the water confined within the uncured hose h is also heated and expands.

The pressure exerted on the inner surface of the hose thus rises above that existing in the autoclave and exerted by the steam on the water W and thereby on the outer surface of the hose, so that the elastomeric material is forced by the opposed pressures into the interstices of the reinforcement to effect the desired good adhesion between the elastomeric material and the reinforcement. The expanding water also exerts a longitudinal force on the hose, of course, and the combination of the radial and longitudinal forces serves to ensure that the ultimate molded hose will be fully round in cross-section as well as of the intended diameter and will resist flattening out under its own weight after vulcanization. It will also be understood that the presure relief valves 30 and 31 are provided and set to release at a predetermined pressure differential between the pressure within the hose and the pressure within the autoclave, to ensure that the water pressure within the hose h cannot rise sufficiently above the ambient autoclave pressure to cause the hose to become oversized or even to burst during vulcanization. On the average, a pressure differential of 10 p.s.i. is found to be satisfactory, but if desired, depending on the hose constructions being processed, the pressure differential may be from as low as about 1 p.s.i. to as high as about 100 p.s.i.

The cure cycle, which from a practical standpoint is taken as beginning when the water in the tub 20 has been heated to the vulcanizing temperature, is continued for a time interval sufficient to ensure the substantially full cure of the elastomeric material. In general, a cure cycle on the order of about 45 minutes is found adequate although the cycle may be longer or shorter depending on the cure requirements of the elastomeric compound used. At the end of the cure cycle, the valve 13 is closed to discontinue the admission of steam into the autoclave, and the valve 15 is opened to vent the autoclave and permit both the pressure and the temperature within the autoclave to drop relatively slowly. During this "cool down" period, of course, the relief valves 30 and 31 function automatically to maintain the internal pressure in the hose at the desired pressure differential above the surrounding pressure. The cooling period is continued until the ambient temperature in the autoclave drops to less than 200° F. and preferably until the temperature is about 150° F. If desired, the rate of cooling of the ambient atmosphere in the autoclave may be accelerated somewhat through the use of a water spray. At that point, the valve 18 is opened to drain accumulated condensate from the autoclave. Thereupon, the autoclave door 11a is opened, the valve 33 is opened to drain the water from the tub, and the valves 23 and 24 are opened to release the water pressure within the hose, compressed air being blown into the cured hose via the valve 23 to expel the water from the hose via the valve 24. The tub 20 is then removed from the autoclave and, after the hose has been disconnected from the clamping devices 25 and 26, the pallet P is lifted out of the tub for transfer to the final hose processing station at which the hose is passed through a cleaning device and, if desired, is marked with suitable identifying indicia, e.g. number codes and the like, applied to its exterior surface.

It will be noted that the efficacy of the differential pressure hose curing method according to the present invention in leading to the attainment of optimum adhesion between the elastomeric material and the reinforcement is a direct function of the annular clamping of the ends of the hose. Thus, it is this feature which ensures that the fluid pressure in the vulcanizer cannot leak in between proximate layers of elastomeric material along an intermediate layer of reinforcement material. The significance of this feature is that if such leakage of pressure were not inhibited, it would not be feasible, for reasons which will be clear to those skilled in the art, to establish across the hose wall thickness, i.e. between the inner and outer hose surfaces, a pressure differential sufficient to enable the elastomeric material to be forced as much as possible into the interstices of the reinforcement material.

The vulcanization of molded reinforced elastomeric hose can, in accordance with another aspect of the present invention, also be effected by a curing method in which equal pressures are applied to the inner and outer hose surfaces, but which nevertheless utilizes the aforesaid annular clamping principle to prevent any entry of fluid pressure along a layer of reinforcement material into the space occupied thereby between proximate layers of elastomeric material. This method can be practiced, for example, by the apparatus of FIGS. 4 to 6, with the hose ends d and d' secured to the pipes or fittings 21 and 22 as before, but with the valves 23 and 24 of these fittings left open to establish communication between the interior of the hose and the interior of the autoclave, so that the fluid pressure admitted into the vulcanizer can be applied to the interior of the hose as well. Alternatively, the method can be practiced without the hose ends being connected to the fittings 21 and 22, the annular clamping of the hose ends in this version of the method being effected by a pair of clamping devices each consisting of a short, rigid, open-ended tubular core member to be fitted into the hose and of a cooperating clamping band or strap. Such clamping devices, which can be separate elements or parts of a single fixture, are not shown per se in the drawing, but it will be readily understood that each will be substantially identical in cross-section to the devices 25 and 26 as illustrated in FIG. 6. The requisite degree of penetration of the elastomeric material into the interstices of the reinforcement is nevertheless achieved, since the pressure applied to either hose surface will be greater initially than any back or counter pressure existing in the space occupied by the reinforcement by virtue of the presence of air or other gas trapped between the elastomer layers. It should be noted, however, that molded hose cured by the equal pressure method may be characterized by a slight degree of flattening or out of round, due to the effect of its own weight during vulcanization, since the hose is not subjected to the radial and longitudinal expansion forces which are present in the differential pressure method. In the equal pressure hose curing method, of course, the hose may be either filled with liquid or not, although preferably it will be. Where it is not liquid-filled, the hose ends are left above the surface of the liquid bath to enable the autoclave steam to flow through the interior of the hose.

It will be apparent that although the herein described hose curing methods are batch processes, they are not limited to use with extremely short lengths of hose. In actual practice, depending on the hose construction and the intended hose diameter (which determine how compactly the hose can be arranged and disposed in the autoclave), hose lengths of as much as 2,000 feet have been cured by the methods of this invention. Moreover, except as above noted, such hose is found to compare favorably in quality and appearance with the best hose vulcanized by the lead press method. Also, due to the elimination of the need for first applying a lead sheath to and then removing the sheath from the hose, it has become possible to produce the hose with far less scrap losses. This aspect, in conjunction with the fact that neither of the hose curing methods of the present invention requires the provision of a solid mandrel in the hose or a system for continuously circulating hot water under pressure through the hose during the cure cycle (which greatly simplifies the apparatus), leads to the additional advantage that the hose can be produced at considerably lower overall manufacturing costs.

It will further be understood that the foregoing description of preferred embodiments of the present invention is for purposes of illustration only, and that the various structural and operational features and relationships herein disclosed are susceptible to a number of modifications and changes none of which entails any departure from the spirit and scope of the present invention as defined in the hereto appended claims.

Having thus described the invention, what is claimed and desired to be protected by Letters Patent is:

1. In the method of producing vulcanized reinforced elastomeric hose having a body construction characterized by a plurality of tubular layers of elastomeric material and a layer of filamentary reinforcement material between each proximate pair of layers of elastomeric material; the improvement comprising the steps of:
  (a) annularly clamping an uncured hose at each of its opposite ends between respective cooperating inner and outer clamping elements engaging the inner and outer surfaces, respectively, of said uncured hose for inhibiting any entry of fluid pressure into the space between such proximate layers of elastomeric material along the intermediate layer of reinforcement material, said uncured hose over the entire expanse of said inner and outer surfaces thereof except at the clamped ends being free of any closely juxtaposed solid confinement structure;
  (b) immersing said uncured hose in a bath of liquid sufficient to cover said uncured hose substantially completely; and
  (c) without effecting any forced flow of a fluid pressure medium through said uncured hose, subjecting said uncured hose at both said inner and said outer surfaces thereof and while immersed in said bath of liquid to the direct action of fluid pressure in a pressurized thermal environment for a predetermined period of time to effect the vulcanization of said elastomeric material and the penetration thereof into said reinforcement material.

2. The method of claim 1, wherein said uncured hose is disposed in a coiled configuration while subjected to said thermal environment.

3. The method of claim 1, wherein said liquid is water.

4. The method of claim 1, wherein said uncured hose is filled with liquid.

5. The method of claim 4, wherein the liquid in said bath and filling said uncured hose is water.

6. The method of claim 1, wherein said pressurized thermal environment is established in an autoclave or vulcanizer by admission into the latter of a pressurized fluid heating medium.

7. The method of claim 6, wherein said pressurized fluid heating medium is saturated steam.

8. The method of claim 7, wherein said liquid is water.

9. The method of claim 7, wherein said uncured hose is filled with liquid.

10. The method of claim 9, wherein the liquid in said bath and filling said uncured hose is water.

11. The method of claim 1, wherein equal fluid pressures are applied to said inner and outer surfaces of said uncured hose.

12. The method of claim 1, wherein said pressurized thermal environment is established in an autoclave or vulcanizer by admission into the latter of a pressurized fluid heating medium, and said hose ends are clamped to leave said uncured hose open-ended and with its interior in direct fluid communication with the interior of said autoclave or vulcanizer, so that equal fluid pressures are applied to said inner and outer surfaces of said uncured hose.

13. The method of claim 12, wherein said liquid is water.

14. The method of claim 12, wherein said pressurized fluid heating medium is saturated steam.

15. The method of claim 14, wherein said uncured hose is filled with liquid.

16. The method of claim 15, wherein the liquid in said bath and filling said uncured hose is water.

17. The method of claim 1, wherein a higher fluid pressure is applied to the inner surface of said uncured hose than to the outer surface thereof.

18. The method of claim 1, wherein said pressurized thermal environment is established in an autoclave or vulcanizer by admission into the latter of a pressurized fluid heating medium, said uncured hose is filled with a liquid, and said hose ends are clamped to leave said uncured hose closed at said ends with said last-named liquid confined therein, so that upon heating of said liquid in said bath and therethrough said confined liquid in said uncured hose a higher pressure is applied by said confined liquid to said inner surface of said uncured hose than is applied to said outer surface of the latter by said pressurized fluid heating medium.

19. The method of claim 18, wherein said liquid in said bath and in said uncured hose is water.

20. The method of claim 18, wherein said pressurized fluid heating medium is saturated steam.

21. The method of claim 20, wherein said liquid in said bath and in said uncured hose is water.

22. The method of claim 18, wherein the pressure differential of said fluid pressure applied to said inner surface of said uncured hose over said fluid pressure applied to said outer surface of said uncured hose is controlled not to exceed a predetermined maximum.

23. The method of claim 22, wherein said maximum pressure differential is between about 1 and 100 p.s.i.

24. The method of claim 22, wherein said maximum pressure differential is between about 5 and 15 p.s.i.

25. The method of claim 22, wherein said maximum pressure differential is about 10 p.s.i.

26. The method of claim 22, wherein said pressurized fluid heating medium is saturated steam, and both said liquid in said uncured hose and said liquid in said bath are water.

27. The method of claim 1, wherein said liquid is oil.

28. The method of claim 1, wherein said liquid is glycol.

29. In the method of producing vulcanized reinforced elastomeric hose having a body construction characterized by a plurality of tubular layers of elastomeric material and a layer of filamentary reinforcement material between each proximate pair of layers of elastomeric material; the improvement comprising the steps of:
  (a) immersing an uncured hose of finite length in a bath of water sufficient to cover said uncured hose entirely;

(b) filling said uncured hose with water;

(c) closing said uncured hose at the opposite ends thereof to confine said water therein, and concomitantly annularly clamping said uncured hose at each of its opposite ends between respective cooperating inner and outer clamping elements engaging the inner and outer surfaces, respectively, of said uncured hose for inhibiting any entry of fluid pressure into the space between such proximate layers of elastomeric material along the intermediate layer of reinforcement material, said uncured hose over the entire expanse of said inner and outer surfaces thereof except at the clamped ends being free of any closely juxtaposed solid confinement structure;

(d) enclosing said water bath with said immersed uncured hose therein in an autoclave;

(e) admitting steam under an elevated pressure corresponding to the intended vulcanizing temperature of said elastomeric material into said autoclave to heat said water covering said uncured hose and therethrough said water confined within said uncured hose to elevated temperatures corresponding to said vulcanizing temperature;

(f) maintaining the ambient pressure and temperature conditions within said autoclave at their elevated levels for a predetermined period of time to effect the vulcanization of said elastomeric material and the penetration thereof into said reinforcement material; and (g) automatically bleeding water from the interior of said uncured hose during the vulcanizing operation in response to the pressure of said water confined in said uncured hose rising due to thermal expansion, to prevent said pressure of said confined water from rising to a level more than a predetermined amount above said ambient pressure.

30. The method of claim 29, wherein the maximum extent to which the pressure within said uncured hose is permitted to exceed the pressure outside said uncured hose is between about 1 and 100 p.s.i.

31. The method of claim 29, wherein the maximum extent to which the pressure within said uncured hose is permitted to exceed the pressure outside said uncured hose is between about 5 and 15 p.s.i.

32. The method of claim 29, wherein the maximum extent to which the pressure within said uncured hose is permitted to exceed the pressure outside said uncured hose is about 10 p.s.i.

References Cited

UNITED STATES PATENTS

| | | | |
|---|---|---|---|
| 2,483,709 | 10/1949 | Paulsen | 264—347 |
| 1,730,639 | 10/1929 | Blaker | 264—347 |
| 408,376 | 8/1889 | Cobb | 264—347 |
| 1,812,282 | 6/1931 | Blaker | 264—347 |
| 3,586,558 | 6/1971 | Galloway et al. | 156—149 |

CHARLES E. VAN HORN, Primary Examiner

F. FRISENDA, Jr., Assistant Examiner

U.S. Cl. X.R.

156—156, 287, 311; 264—347